United States Patent [19]

Flaig et al.

[11] 4,279,235
[45] Jul. 21, 1981

[54] APPARATUS FOR FIXING THE COMPOSITION OF THE GAS CONTENT OF INTERNAL COMBUSTION ENGINE CYLINDERS

[75] Inventors: Ulrich Flaig, Markgroningen; Fridolin Piwonda, Gerlingen; Gerhard Stumpp, Suttgart; Wolf Wessel, Oberriexingen, all of Fed. Rep. of Germany

[73] Assignee: Robert Bosch GmbH, Stuttgart, Fed. Rep. of Germany

[21] Appl. No.: 70,471

[22] Filed: Aug. 28, 1979

[30] Foreign Application Priority Data

Nov. 15, 1978 [DE] Fed. Rep. of Germany ....... 2849554

[51] Int. Cl.$^3$ ............................................. F02M 25/06
[52] U.S. Cl. ..................................... 123/569; 123/571
[58] Field of Search .................... 123/119 A, 571, 569

[56] References Cited

FOREIGN PATENT DOCUMENTS 2850931  6/1979  Fed. Rep. of Germany ...... 123/119 A
2803750  8/1979  Fed. Rep. of Germany ...... 123/119 A

*Primary Examiner*—Wendell E. Burns
*Attorney, Agent, or Firm*—Edwin E. Greigg

[57] ABSTRACT

An apparatus for fixing the composition of the gas content and the degree of filling of cylinders in an internal combustion engine having autoignition, including a fuel metering device to which a signal dependent at least on the position of the driving pedal can be delivered and having an exhaust gas feedback control element in the air intake line as well as an apparatus for controlling the exhaust feedback rate. The apparatus includes measurement value transducers for the at least indirectly detectable total cylinder filling and the ratio of fresh air to exhaust gas or the air ratio pertaining to the aspirated fresh air and/or the fuel metering is influenced among others in accordance with this measurement value. The detection of the total cylinder filling can be accomplished indirectly by using measurement techniques for detecting pressure and temperature in the intake manifold. Besides using pressure transducers, whose output signal may be corrected in accordance with temperature, if desired, it is also possible to use an arrangement for measurement of the total gas quantity between the exhaust feedback point and the inlet valves. The object of the proposed apparatus is to set the mixture of fresh air and exhaust gas which is optimal at any given time with respect to toxic substances in the exhaust, by means of processing as many observable influencing factors as possible, and in particular by processing the total cylinder filling, which is of significance especially in terms of the limitation of solids in the exhaust which is expected to be made a legal requirement. Alternatively, the signal for the total cylinder filling can be used in order to adjust a suitably controllable supercharger via a governor in such a manner that the total cylinder filling (charge quantity) is constantly controlled. Thus, under altered environmental conditions, the optimal air ratio for normal conditions pertaining to the aspirated fresh air can be maintained with respect to toxic substances in the exhaust.

10 Claims, 8 Drawing Figures

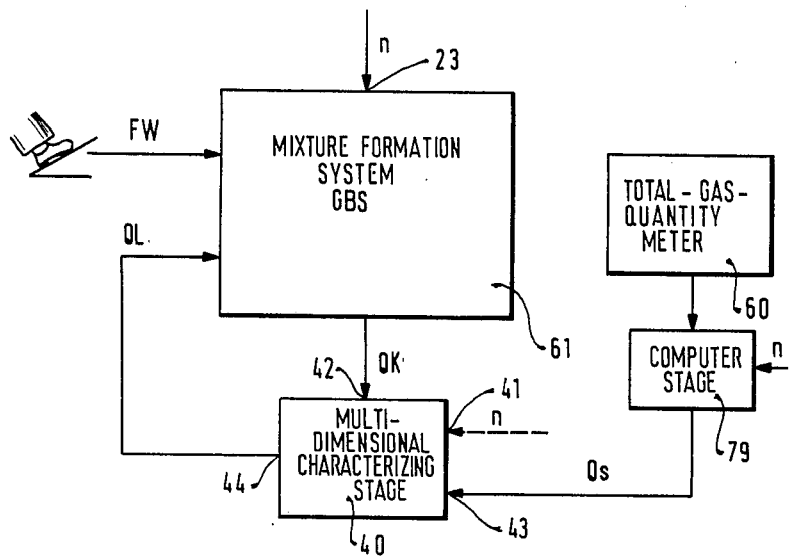
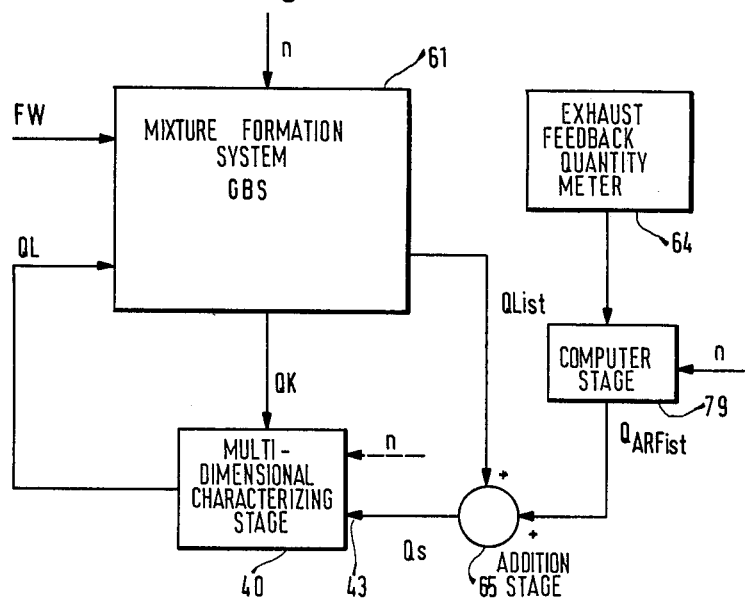

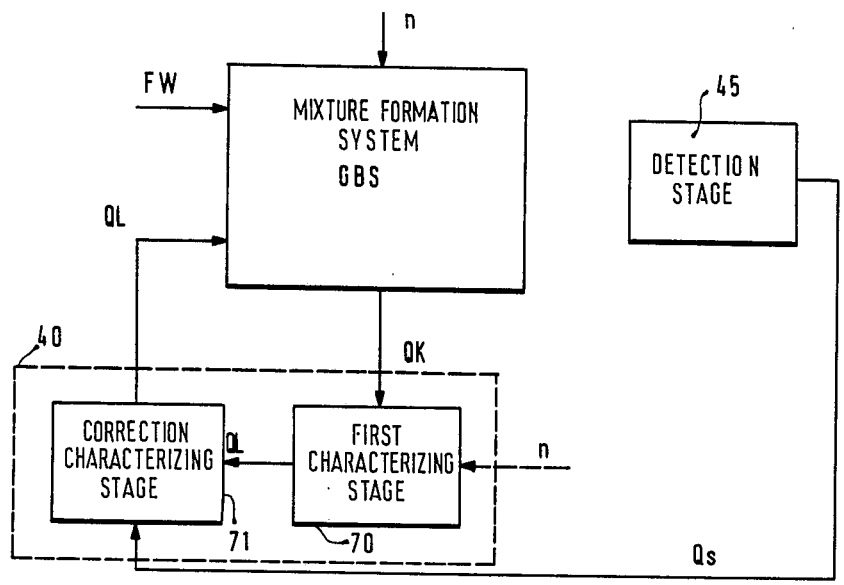
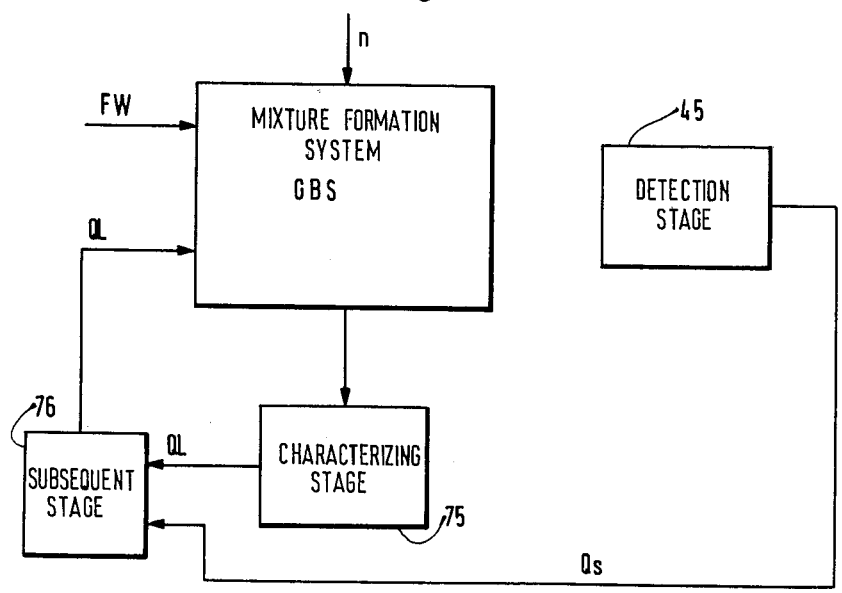

APPARATUS FOR FIXING THE COMPOSITION OF THE GAS CONTENT OF INTERNAL COMBUSTION ENGINE CYLINDERS

BACKGROUND OF THE INVENTION

The invention relates to an apparatus for fixing the composition of the gas content of internal combustion engine cylinders. A system is known in which the air ratio λ pertaining to the aspirated fresh air and optimal for normal conditions is set in accordance with load and rpm by means of the open or closed loop controlled adjustment of an exhaust feedback valve and is governed with the aid of air quantity measurement (German Offenlegungsschrift No. 24 09 774). However, in this apparatus, a quantity of exhaust gas, not clearly definable, mixes in with the aspirated fresh-air flow, the extent depending on pressure and temperature of the fresh air and the exhaust and also on the state of the engine and, if it is present, the supercharger. Large deviations from the normal state result, particularly at extremes of ambient temperature and because of differing ambient pressure relating to elevation above sea level. It is also known that the creation of toxic substances during combustion in the cylinder is substantially determined by the flame velocity and the peak combustion temperature. These variables are dependent, in turn, on the total cylinder content, among other factors. In the known system, these variables cannot be sufficiently attended to and/or controlled.

OBJECT AND SUMMARY OF THE INVENTION

Accordingly, it is a principle object of the invention to be able to set optimum exhaust feedback rates, with respect to toxic substances, within broad limits, despite continuously changing environmental conditions. The toxic substances may be determined, for example, by the performance of a test prescribed by law.

Various embodiments of the invention as disclosed and claimed herein provide particularly simple methods of determining the toal cylinder content. In addition, points of intervention are given in the control system of a Diesel engine in which the desired ration of fresh air to exhaust gas can be set in a particularly simple manner.

The invention will be better understood as well as further objects and advantages thereof become more apparent from the ensuing detailed description of the preferred embodiments taken in conjunction with the drawings.

BRIEF DESCRIPTION OF THE DRAWINGS

FIG. 3 is a block diagram of a first embodiment for detecting the total cylinder content;

FIG. 4 is a block diagram of a second embodiment for detecting the total cylinder content;

FIG. 7 is a block diagram of a fifth embodiment for detecting the total cylinder content; and FIG. 8 is a block diagram of a sixth embodiment for detecting the total cylinder content.

DESCRIPTION OF THE PREFERRED EMBODIMENTS

Figure 1:
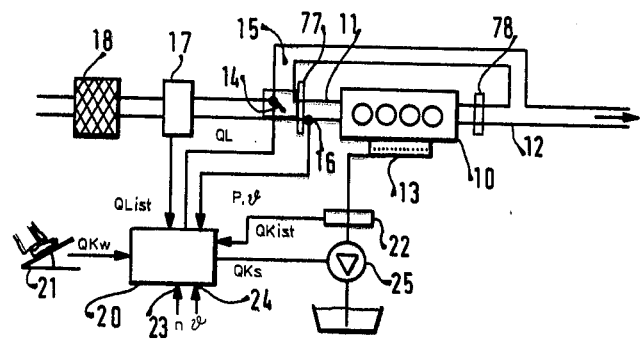
FIG. 1 is a schematic representation of a Diesel engine with its measurement locations and possible points of intervention in accordance with the invention.

Turning now to FIG. 1, an internal combustion engine with autoignition is shown schematically, together with the essential circuitry. The engine itself is identified by the reference numeral 10, and associated with it are an air intake manifold 11, an exhaust line 12, and an injection pump 13 for supplying fuel to the various injection valves (not shown). Located in the air intake manifold 11, is an exhaust feedback control element 14 which comprises a valve (similar to an engine valve) and which can be continuously adjusted by a preferably electromagnetic control member. Thus, to a variable extent, the control element 14 opens up a cross section from an exhaust feedback line 15 to the air intake manifold 11.

If the pressure ratios dictated by engine conditions do not permit sufficient exhaust gas to be fed back only by means of opening the valve 14, then a throttle valve located upstream in the air intake manifold 11 can be articulated onto the valve 14 which simultaneously throttles the fresh-air flow while the valve 14 opens. As a result, it is possible to feed back the desired quantity of exhaust gas.

Upstream of the exhaust feedback control element 14, there is an air flow rate meter 17 and upstream from it, an air filter 18. Downstream of the exhaust feedback control element 14, following a supercharger 77, which may be present, there is at least one transducer 16 for the degree of total cylinder filling.

A control device 20 is coupled on the input side with a driving pedal 21, which furnishes a desired fuel signal QK. The control device 20 is also coupled on the input side with the air flow rate meter 17, a fuel quantity meter 22 and, via inputs 23 and 24, with transducers for rpm, temperature, and so forth. In addition, the control device 20 receives the measurement results from the cylinder content meter or transducer 16. On the output side, the control device 20 is connected with a fuel pump 25, and also with the exhaust feedback control element 14.

During combustion in the cylinders of an internal combustion engine, the higher the combustion temperature is and the more oxygen is present in the cylinder, the more toxic $NO_x$ components are created. A reduction of the oxygen in the partial-load range only by means of throttling the fresh air, however, would result in a higher peak combustion temperature because of the reduced filling volume in the cylinders, because at the same level of energy conversion, the heat capacity of the cylinder contents would drop. The portion of the fresh air withheld from the cylinder by throttling must therefore be replaced by exhaust gas which is substantially poorer in oxygen, in order to maintain the heat capacity of the cylinder contents to the greatest possible extent. This enables a reduction to the minimum required value of the oxygen component with respect to hydrocarbons and soot, without the temperature of combustion rising to a critical extent. Only in this manner can a considerable reduction in $NO_x$ be attained with only a small increase in the emission of hydrocarbons and smoke.

In the event of lower initial air densities at high intake temperatures and/or low air pressure at higher elevations, the large cylinder filling volume which is also desired in order to improve emissions in the partial-load range (exhaust-feedback range) both in the suction engine and in an engine having a supercharger, and which is present under normal conditions, is no longer attained. Although the air ration pertaining to the fresh air can be held constant up to a certain limit by means of a reduced exhaust feedback, higher peak combustion termperatures are attained, at the same level of energy conversion, as a result of the reduced total content of the cylinders. These higher peak temperatures cause a consequent increase in the toxic $NO_x$ component of the exhaust, and a drop in the hydrocarbon component.

The original distribution of toxic substances in the exhaust can be approximately attained again by varying the air ratio $\lambda$ pertaining to the fresh air in accordance with the total cylinder filling detected by measurement techniques.

Another possible means of maintaining the original charge even with a reduced density in aspirated air, is in controlling a supercharger which then is necessarily oversized for normal conditions in such a manner that the total cylinder charge remains constant. In order to do so, the total cylinder filling must again be detected by measurement techniques, at least indirectly.

The status prevailing in the intake manifold before the inlet valves, for instance, permits a conclusion as to the level of the total cylinder filling. To this end, a measurement location indicated by the transducer 16 is provided as shown in FIG. 1, at which a conventional, absolute pressure meter or transducer detects the pressure and a temperature meter similarly detects the temperature of the aspirated gas mixture, so that its density and, using the known stroke volume, the total cylinder filling can be ascertained.

In accordance with this indirect signal for the total cylinder filling, an appropriately altered set-point value for air quantity is set by means of the control device 20 via the exhaust feedback control element 14, in order to make the ratio of exhaust gas to fresh air dependent on the particular total cylinder filling at the time. This adaptation of the mixture ratio of fresh air to exhaust gas enables optimal operation of the engine with respect to the toxic substances in the exhaust, and a predetermined upper limit of $NO_x$ emissions can be maintained.

Figure 2:
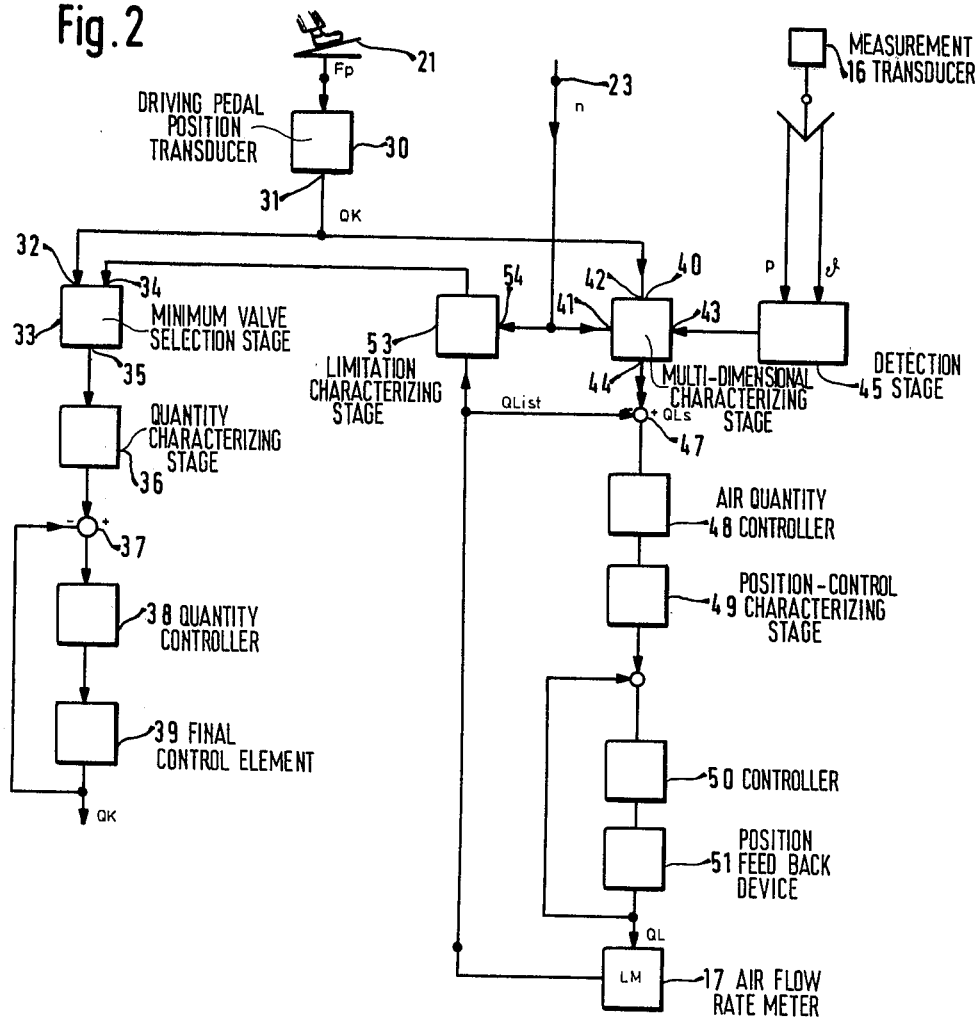
FIG. 2 is a block diagram of the control device of the invention for the fuel, fresh-air, and exhaust gas metering in an internal combustion engine.

One possible embodiment of the control device 20 is shown in the block circuit diagram of FIG. 2. Elements in FIG. 2 corresponding to those of FIG. 1 are given the same reference numerals.

The driving pedal 21 acts upon a driving pedal position transducer 30, at whose output 31 there is a desired-fuel signal $QK_w$. This desired-fuel signal $QK_w$ is delivered to a first input 32 of a minimum-value selection stage 33 having a further input 34, whose output 35 in turn is coupled with a quantity-characterizing stage 36. This stage 36 associates a particular signal value from the output of the minimum-value selection stage 33 with a particular fuel quantity value, which is subsequently fed via a comparison point 37 to a quantity controller 38 with a final control element 39. The output of this final control element 39 is linked in turn with the comparison point 37 for the purpose of feedback of the direct or indirect quantity signal.

While the units or stages numbered 33, 36, 38 and 39 are part of the "fuel side" of the controller, further stages represent the corresponding "air side." The output 31 of the driving pedal position transducer 30 is linked with a multi-dimensional characterizing stage 40, which has three inputs 41, 42 and 43 and one output 44. This multi-dimensional performance graph is basically a computer circuit, in which one output variable is computed in the manner of the invention on the basis of more than two input variables. Performance graphs which have more than two input variables are virtually impossible to obtain in practice in their complete form. Accordingly, the attempt is made to realize the multi-dimensional performance graph 40 by means of a combination of performance graphs each having at the most two input variables (one exemplary embodiment is shown in FIG. 7), or to represent it by means of algebraic operations. An rpm signal from the input 23 of the governor is present at the input 41. The desired-fuel signal from the driving pedal position transducer 30 is present at the input 42 and the output signal of a detection stage 45 for the total cylinder filling is present at the input 43. The input values for the detection stage 45 are a pressure signal and a temperature signal from the measurement transducer 16 in the air intake manifold 11 of the internal combustion engine 10.

At the output 44 of the characterizing stage 40, a set-point value for air quantity QLs appears, which is fed further to a comparison point 47. The next element is an air quantity controller 48 with a subsequent position-control characterizing stage 49 for the position of the exhaust feedback control element 14 of the subject of FIG. 1.

Following this characterizing stage 49, in turn, is a complete closed-loop control circuit for the setting of this control element 14 having a controller 50 and the position feedback device 51. The position of the exhaust feedback control element 14 determines the fresh-air flow in the intake manifold 11, which is detected by means of the air flow rate meter 17 and is the input value both for a limitation characterizing stage 53 and for the comparison point 47. An rpm signal is fed to the limitation characerizing stage 53 via a further input 54. On the output side, this limitation characterizing stage 53 is connected with the input 34 of the minimum-value selection stage 33.

The mode of operation of the arrangement illustrated in FIG. 2 is as follows:

Depressing the driving pedal 21 on the part of the operator of the vehicle equipped with this engine effects a corresponding desired-quantity signal for fuel at the output 31 of the driving pedal position transducer 30. This is because in autoignition engines, the power output is primarily determined by means of the quantity of fuel injected. This desired quantity is passed on via the minimum-value selection stage 33, which serves to set a maximum quantity limit, to the quantity characterizing stage 36 and the subsequent quantity controller furnishes the desired quantity. Parallel to this, a particular desired fuel quantity at a desired $\lambda$ ratio produces an appropriate set-point signal for the fresh-air quantity via the characterizing stage 40. This air quantity is dependent on the rpm, among other factors, which affects the output signal of the characterizing stage 40 via the input 41.

The selected set-point value for fresh air is compared with the measurement signal for the fresh-air quantity from the air flow rate meter 17. The control deviation is processed in the controller 48 and converted via the position-control characterizing stage 49 into a corresponding set-point value for the exhaust-feedback control element 14, whose position is controlled via the controller 50 and the feedback device 51. On the basis of this actual value for fresh air, the highest permissible fuel quantity is also signalled to the minimum-value selection stage 33. Thus, in the arrangement of FIG. 2, a required fresh-air quantity is determined in principle on the basis of a desired fuel quantity via a predetermined λ value, and this fresh-air quantity is set via the exhaust feedback control element 14 acting as a mixing device. The rest of the aspirated volume then comprises the exhaust gas, which because of the given pressure conditions flows into the intake manifold 11 of the internal combustion engine 10 via the exhaust feedback line 15 opened up by the exhaust feedback control element 14.

The output signals of the detection stage 45 for the total cylinder filling also affect the characterizing stage 40 in the sense that all the variables which can be detected by measurement techniques and which determine the combustion behavior in the cylinders have an effect on the set-point value for air quantity. This is particularly true with respect to clean exhaust at partial load.

Accordingly, on the basis of signals for driving pedal position, rpm, and total cylinder filling, an optimum fresh-air quantity is ascertained with respect to toxic exhaust substances in the arrangement of FIG. 2. The exhaust feedback control element 14 acting as a mixing device dispenses this fresh-air quantity and simultaneously mixes in the maximum possible exhaust feedback quantity for the particular pressure conditions prevailing at that time. By way of example, FIG. 2 shows the generation of a signal for total cylinder filling via a pressure and a temperature signal.

The following FIGS. 3–8 show various methods for furnishing and processing signals for the total cylinder filling. Thus, FIG. 3 shows a system in which the total quantity of gas aspirated by the engine 10 is measured by means of a total gas-quantity meter 60 in the intake manifold 11 subsequent to the entry of the exhaust feedback line. The total-quantity measurement signal is converted in the computer stage 79, by means of an rpm signal, into a total cylinder filling signal Qs and this signal is delivered to the input 43 of the characterizing stage 40. In FIG. 3, the block 61 represents a "mixture formation system" GBS and contains the remaining stages known in FIG. 2.

According to FIG. 3, the total-gas-quantity meter 60 mentioned there can be realized, for instance, by means of a baffle plate, following the principle of the known L-Jetronic device. However, this measurement method has the disadvantage, in contrast to the combined pressure-temperature measurement method for the total cylinder charge, that soot particles from the exhaust can stick to the baffle plate which in the course of time can adversely affect the measurement.

FIG. 4 shows an arrangement which has an exhaust feedback quantity meter 64, the output signal $QARF_{ist}$ (that is, the actual value for exhaust feedback quantity) of which, again converted in a computer stage 79 to the quantity per stroke, is added in an addition stage 65 to the actual-value air quantity signal already present from the mixture formation system 61. The further processing of the signal takes place as in the apparatus of FIG. 3.

Figure 5:
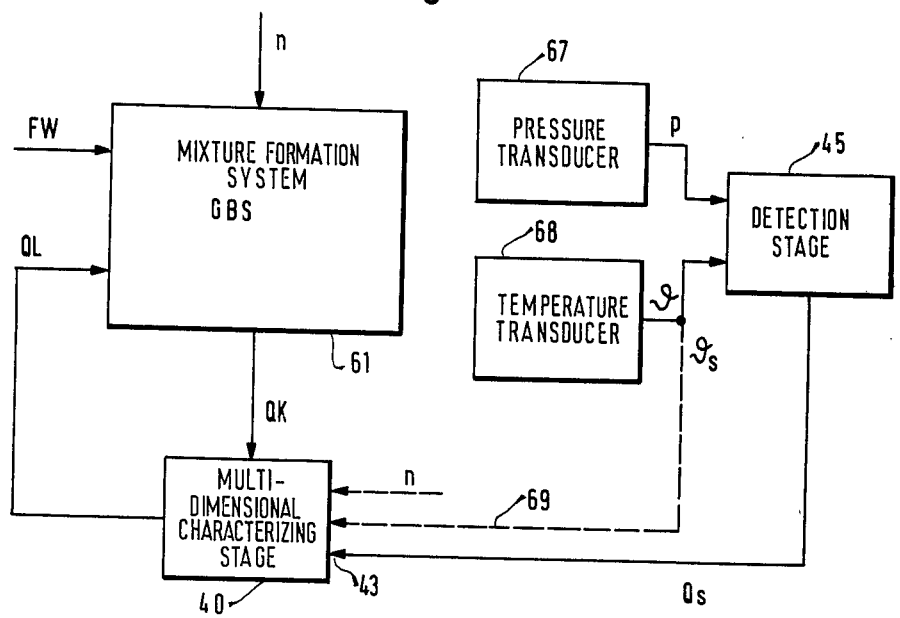
FIG. 5 is a block diagram of a third embodiment for detecting the total cylinder content.

FIG. 5 corresponds to what is shown in FIG. 2. The total cylinder filling Qs is determined from a measurement of temperature and absolute pressure in the intake manifold 11. The measurement signals from the pressure transducer 67 and temperature transducer 68 are delivered to the detection stage 45 for the total cylinder filling and there, from both input signal, one output signal is furnished pertaining to the total filling Qs. This arrangement has the advantage that the intake manifold temperature θs (temperature at the onset of compression) can also be used to determine the optimum exhaust feedback rate by carrying the temperature signal θs on, via a broken line 69, to the characterizing stage 40.

When there are no very strict requirements of precision, it is also conceivable that beyond the intake manifold temperature, only the intake manifold overpressure compared with ambient pressure need be detected and this acts as a correction signal on the set-point quantity value. This is sufficient particularly when an ambient pressure correction is already available and only an improved adaptation to the dynamic conditions of the supercharger and the exhaust feedback control element is needed.

Figure 6:
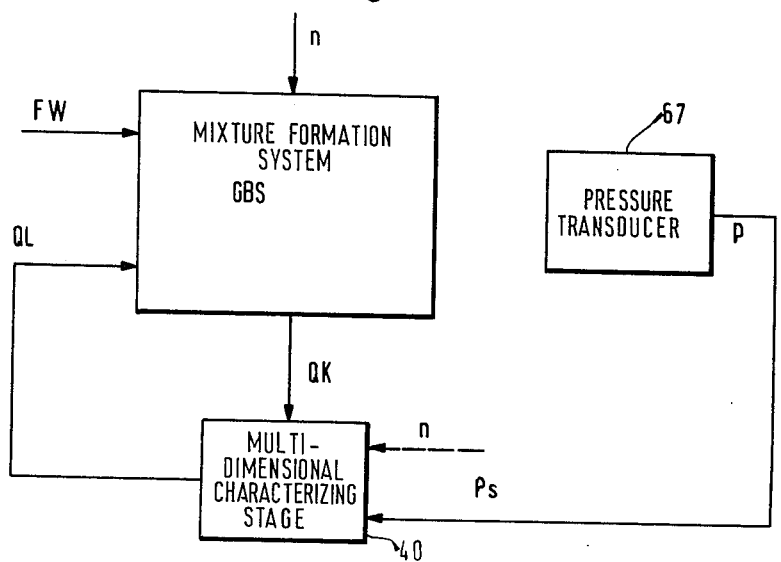
FIG. 6 is a block diagram of a fourth embodiment for detecting the total cylinder content.

FIG. 6 shows a simplified, and thus, less precise, variant of the system of FIG. 5. Here, only the intake manifold pressure is detected by means of a pressure inducer 67 and delivered to the characterizing stage 40.

The subjects of FIGS. 7 and 8 are apparatuses in which the processing of the signals is modified and simplified. It is here assumed that the stages 45, that is, the detection stages for the total cylinder filling, contain one of the systems shown in FIGS. 3–6 for the detection of the total cylinder filling.

In many cases, a four-dimensional characterizing stage 40 is not necessary in order to obtain sufficient precision.

In the system of FIG. 7, accordingly, the four-dimensional characterizing stage 40 is subdivided into three-dimensional characterizing stages. In a first characterizing stage 70, the optimum set-point air quantity for normal conditions, $QL_{soll}$ is determined. This quantity is corrected in a subsequent correction characterizing stage 71 in accordance with the total cylinder filling.

Frequently, the optimum exhaust feedback rate is dependent only on the load, that is, on the driver's intention $QK_w$, but not on the rpm. Should this be the case, then the four-dimensional characterizing block 40 can easily be reduced to three dimensions. FIG. 8 shows an arrangement which has been simplified in comparison with that of FIG. 7, in which it is assumed that the optimum set-point air quantity per stroke is independent of the rpm and the normal set-point air-quantity signal $QL_{soll}$ can be corrected by means of a simple arithmetical calculation to the true set-point air-quantity signal $QL_{soll}$. Then the characterizing stage 70 in the arrangement of FIG. 7 is reduced to a characterizing stage 75, whose output signal $QL_{soll}$ can be linked in a subsequent stage 76 in the following manner, by way of example:

$$QL_{soll} = QL^*_{soll}[1 + K(Qs - Qs_{normal})]$$

wherein $Qs_{normal}$ is the known cylinder filling, presumed to be constant, under normal conditions, and wherein K is a system constant.

Beyond the systems described, in which a set-point air quantity is furnished on the basis of a desired fuel quantity and the ration of fresh air to exhaust gas is determined accordingly, a variation in the metered fuel quantity is also conceivable in accordance with the total cylinder filling. However, this variation can be undertaken only within narrow limits, because of the virtually direct relationship between the quantity of fuel injected and the engine power output.

The foregoing relates to preferred embodiments of the invention, it being understood that other embodiments and variants thereof are possible within the spirit and scope of the invention, the latter being defined by the appended claims.

What is claimed and desired to be secured by Letters Patent of the United States is:

1. An apparatus for fixing the composition of the content and the degree of filling of cylinders in an internal combustion engine with autoignition, comprising a fuel metering device, means for delivering a signal to said fuel metering device dependent at least on the position of the driving pedal, a control element for mixing the aspirated fresh air in said engine with fed-back exhaust gas, measurement value transducer means for the total cylinder filling which is detectable at least indirectly and means for influencing the ratio of fresh air to fuel in accordance with the measurement value from said transducer means by varying the recirculated exhaust gas flow.

2. An apparatus in accordance with claim 1, wherein said transducer means include a pressure transducer for detecting the intake pressure of said engine to provide a measurement value corresponding to the total cylinder filling and means for correcting said measurement value in accordance with intake temperature.

3. An apparatus in accordance with at least one of the claim 1, wherein said transducer means for determining the total cylinder filling comprises a total gas flow meter plate.

4. An apparatus in accordance with claim 1, including a fresh air manifold and an exhaust gas feedback line and wherein said transducer means for determining total cylinder filling comprises first and second quantity meters, wherein the first meter is located in said fresh-air manifold and the second quantity meter is located in said exhaust gas recirculation pipe; and an adding means to receive the output of the first and second meters to generate a signal corresponding to the aspirated exhaust gas flow.

5. An apparatus in accordance with claim 1, including means for determining a set-point air quantity value on the basis of an engine rpm dependent desired fuel quantity signal via first and second characterizing stages, wherein the first stage combines the desired fuel quantity signal with the set-point air quantity constant cylinder filling conditions, and wherein the second stage adjusts the set-point air quantity according to actual cylinder filling conditions.

6. An apparatus in accordance with claim 1, including a supercharger associated with said internal combustion engine and means for controlling the degree of the total cylinder filling, via the charge pressure in said supercharger.

7. An apparatus in accordance with claim 5, wherein the first characterizing stage is connected to receive only the set-point fuel quantity as input.

8. An apparatus in accordance with claim 7, wherein the second characteristic stage comprises an algebraic operation stage, which corrects the set-point air quantity proportionally to the deviation of actual cylinder filling from normal cylinder filling.

9. An apparatus in accordance with claim 4, including means for determining a set-point air quantity on the basis of a desired fuel quantity signal which is dependent on the position of the driving pedal and the engine speed; and means for approximating the aspirated fresh air quantity to the set-point air quantity by an exhaust gas recirculating system consisting of a pipe and a controllable value which recirculates an exhaust gas flow into the intake manifold corresponding to the difference between set-point air quantity and the aspirated exhaust gas flow.

10. An apparatus in accordance with claim 9, including at least one characterizing stage and means for correcting said set-point air quantity via said characterizing stage at least in accordance with rpm and with the total filling of said cylinders.

* * * * *